US012126914B2

(12) United States Patent
Li

(10) Patent No.: US 12,126,914 B2
(45) Date of Patent: Oct. 22, 2024

(54) HIGH-DYNAMIC-RANGE IMAGE AUTOMATIC EXPOSURE METHOD AND UNMANNED AERIAL VEHICLE

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 151 days.

(21) Appl. No.: 17/663,324

(22) Filed: May 13, 2022

(65) Prior Publication Data
US 2022/0353404 A1    Nov. 3, 2022

Related U.S. Application Data

(63) Continuation of application No. PCT/CN2020/124047, filed on Oct. 27, 2020.

(30) Foreign Application Priority Data

Nov. 13, 2019 (CN) .......................... 201911105126.4

(51) Int. Cl.
*H04N 23/741* (2023.01)
*B64C 39/02* (2023.01)
(Continued)

(52) U.S. Cl.
CPC ......... *H04N 23/741* (2023.01); *B64C 39/024* (2013.01); *H04N 23/73* (2023.01);
(Continued)

(58) Field of Classification Search
CPC ...... H04N 23/741; H04N 23/73; H04N 23/71; B64C 39/024; B64U 50/19; B64U 2101/30; B64U 2201/20; B64D 47/08
See application file for complete search history.

(56) References Cited

U.S. PATENT DOCUMENTS 10,171,729 B2    1/2019  Qin et al.
2007/0263097 A1*  11/2007 Zhao ...................... H04N 23/72
                                                    348/221.1
(Continued)

FOREIGN PATENT DOCUMENTS

CN        101399924 A    4/2009
CN        101494739 A    7/2009
(Continued)

OTHER PUBLICATIONS

International Search Report mailed Jan. 27, 2021; PCT/CN2020/124047.

*Primary Examiner* — Nasim N Nirjhar
(74) *Attorney, Agent, or Firm* — Frank Gao, Esq.

(57) ABSTRACT

Embodiments are a high-dynamic-range (HDR) image automatic exposure method and an unmanned aerial vehicle (UAV). The HDR image automatic exposure method is applicable to a UAV and includes: obtaining statistical information and a window weight of automatic exposure; obtaining an evaluation value of the automatic exposure according to the statistical information and the window weight that are obtained; obtaining a compensation amount of the automatic exposure according to the evaluation value and an obtained automatic exposure target value; and triggering the automatic exposure when the compensation amount meets a preset trigger condition. Therefore, problems such as inaccurate brightness and darkness and oscillation during automatic exposure can be finally avoided.

8 Claims, 4 Drawing Sheets

(51) Int. Cl.
 *B64U 50/19* (2023.01)
 *B64U 101/30* (2023.01)
 *H04N 23/73* (2023.01)

(52) U.S. Cl.
 CPC .......... *B64U 50/19* (2023.01); *B64U 2101/30* (2023.01); *B64U 2201/20* (2023.01)

(56) References Cited

U.S. PATENT DOCUMENTS

| | | |
|---|---|---|
| 2018/0020141 A1 | 1/2018 | Wang et al. |
| 2021/0035273 A1* | 2/2021 | Deng ....................... G06T 5/009 |
| 2021/0110190 A1* | 4/2021 | Park ....................... H04N 23/71 |
| 2021/0243352 A1* | 8/2021 | McElvain ............ H04N 25/134 |

FOREIGN PATENT DOCUMENTS

| | | |
|---|---|---|
| CN | 102143325 A | 8/2011 |
| CN | 102257531 A | 11/2011 |
| CN | 104349070 A | 2/2015 |
| CN | 105635605 A | 6/2016 |
| CN | 105979162 A | 9/2016 |
| CN | 106791470 A | 5/2017 |
| CN | 106791475 A | 5/2017 |
| CN | 107707827 A | 5/2017 |
| CN | 107635102 A | 1/2018 |
| CN | 108270977 A | 7/2018 |
| CN | 108632537 A | 10/2018 |
| CN | 109218626 A | 1/2019 |
| CN | 110100252 A | 8/2019 |
| CN | 110248108 A | 9/2019 |
| CN | 110266954 A | 9/2019 |
| CN | 110891149 A | 3/2020 |

\* cited by examiner

HIGH-DYNAMIC-RANGE IMAGE AUTOMATIC EXPOSURE METHOD AND UNMANNED AERIAL VEHICLE

CROSS-REFERENCE TO RELATED APPLICATIONS

The present application is a continuation of International Patent Application No. PCT/CN2020/124047 filed on Oct. 27, 2020, which claims priority to Chinese Patent Application No. 2019111051264 filed on Nov. 13, 2019, both of which are incorporated herein by reference in their entireties.

TECHNICAL FIELD

The present disclosure relates to the technical field of unmanned aerial vehicles, and in particular, to a high-dynamic-range image automatic exposure method and an unmanned aerial vehicle.

BACKGROUND

At present, aerial vehicles, for example, unmanned aerial vehicles (UAVs), are increasingly widely applied. The UAV has advantages such as a small volume, a light weight, high maneuverability, quick response, unmanned driving and low operation requirements. The UAV carries an aerial camera through a gimbal, to further implement real-time image transmission and detection of high-risk areas, which is a powerful complement to satellite remote sensing and conventional aerial remote sensing. In recent years, the UAV has wide application prospects in disaster investigation and rescue, aerial monitoring, transmission line inspection, aerial photography, aerial survey and military fields.

During aerial photography, high-dynamic-range (HDR) images are obtained by an aerial camera. The HDR image refers to an image generated through a plurality of times of exposure, an HDR video refers to forming a video by continuously generating HDR image sequences through a plurality of times of exposure, and details of bright areas and dark areas in the HDR video can be significantly increased when compared with common videos. Different from the conventional video exposure methods, the HDR video requires a plurality of times of exposure, so that special automatic exposure processing is required; otherwise, problems such as inaccurate brightness and darkness and oscillation may occur during automatic exposure.

SUMMARY

To resolve the foregoing technical problems, embodiments of the present disclosure provide a high-dynamic-range (HDR) image automatic exposure method, and an unmanned aerial vehicle (UAV) to finally avoid the problems of inaccurate brightness and darkness and oscillation during automatic exposure.

To resolve the foregoing technical problems, the embodiments of the present disclosure provide the following technical solution: an HDR image automatic exposure method is provided, applicable to a UAV, and the method including:
obtaining statistical information and a window weight of automatic exposure;
obtaining an evaluation value of the automatic exposure according to the statistical information and the window weight;
obtaining a compensation amount of the automatic exposure according to the evaluation value and an obtained automatic exposure target value; and
triggering the automatic exposure when the compensation amount meets a preset trigger condition.

Optionally, the statistical information includes long exposure statistical information, medium exposure statistical information and short exposure statistical information; and
the long exposure statistical information, the medium exposure statistical information and the short exposure statistical information correspond to a same window weight table, and the window weight table includes the window weights.

Optionally, the evaluation value includes a long exposure evaluation value, a medium exposure evaluation value and a short exposure evaluation value;
the obtaining an evaluation value of the automatic exposure according to the statistical information and the window weight includes:
obtaining a first weight ratio of a window weight corresponding to a long exposure window statistical value in the long exposure statistical information to the total window weight;
obtaining a second weight ratio of a window weight corresponding to a medium exposure window statistical value in the medium exposure statistical information to the total window weight; and
obtaining a third weight ratio of a window weight corresponding to a short exposure window statistical value in the short exposure statistical information to the total window weight; and
the obtaining an evaluation value of the automatic exposure according to the statistical information and the window weight further includes:
multiplying the long exposure window statistical value by the first weight ratio to obtain the long exposure evaluation value;
multiplying the medium exposure window statistical value by the second weight ratio to obtain the medium exposure evaluation value; and
multiplying the short exposure window statistical value by the third weight ratio to obtain the short exposure evaluation value.

Optionally, the automatic exposure target value includes a long exposure target value, a medium exposure target value and a short exposure target value, and the long exposure target value, the medium exposure target value and the short exposure target value respectively correspond to a long exposure weight value, a medium exposure weight value and a short exposure weight value; and
the obtaining a compensation amount of the automatic exposure according to the evaluation value and an obtained automatic exposure target value includes:
obtaining a first compensation amount according to the long exposure target value, the long exposure weight value and the long exposure evaluation value;
obtaining a second compensation amount according to the medium exposure target value, the medium exposure weight value and the medium exposure evaluation value;
obtaining a third compensation amount according to the short exposure target value, the short exposure weight value and the short exposure evaluation value; and
obtaining the compensation amount according to the first compensation amount, the second compensation amount and the third compensation amount.

Optionally, the method further includes: dividing an automatic exposure region into a trigger region, a buffer region and a converge region, where the buffer region is located between the trigger region and the converge region;

a range of an exposure ratio multiple corresponding to the trigger region is less than a first exposure ratio multiple or greater than a second exposure ratio multiple;

a range of an exposure ratio multiple corresponding to the buffer region is greater than the first exposure ratio multiple and less than a third exposure ratio multiple or greater than a fourth exposure ratio multiple and less than the second exposure ratio multiple;

a range of an exposure ratio multiple corresponding to the converge region is greater than the third exposure ratio multiple and less than the fourth exposure ratio multiple; and the first exposure ratio multiple, the third exposure ratio multiple, the fourth exposure ratio multiple and the second exposure ratio multiple increase sequentially; and the triggering the automatic exposure when the compensation amount meets a preset trigger condition includes:

determining that the compensation amount meets the preset trigger condition when the compensation amount is located within the trigger region, and triggering the automatic exposure.

Optionally, the method further includes:

determining that the compensation amount does not meet the preset trigger condition when the compensation amount is located within the buffer region, and skipping triggering the automatic exposure.

To resolve the foregoing technical problems, the embodiments of the present disclosure further provide the following technical solution: an HDR image automatic exposure method apparatus is provided. The HDR image automatic exposure method apparatus includes: an automatic exposure information obtaining module, configured to obtain statistical information and a window weight of automatic exposure;

an automatic exposure evaluation value obtaining module, configured to obtain an evaluation value of the automatic exposure according to the statistical information and the window weight;

an automatic exposure compensation amount obtaining module, configured to obtain a compensation amount of the automatic exposure according to the evaluation value and an obtained automatic exposure target value; and a trigger condition determining module, configured to trigger the automatic exposure when the compensation amount meets a preset trigger condition.

Optionally, the evaluation value includes a long exposure evaluation value, a medium exposure evaluation value and a short exposure evaluation value; and the automatic exposure evaluation value obtaining module includes a weight ratio calculation unit and an evaluation value calculation unit, where the weight ratio calculation unit is configured to obtain a first weight ratio of a window weight corresponding to long exposure statistical information to a total window weight; obtain a second weight ratio of a window weight corresponding to medium exposure statistical information to the total window weight; and obtain a third weight ratio of a window weight corresponding to short exposure statistical information to the total window weight; and the evaluation value calculation unit is configured to multiply the long exposure statistical information by the first weight ratio to obtain the long exposure evaluation value; multiply the medium exposure statistical information by the second weight ratio to obtain the medium exposure evaluation value; and multiply the short exposure statistical information by the third weight ratio to obtain the short exposure evaluation value.

Optionally, the method further includes: dividing an automatic exposure region into a trigger region, a buffer region and a converge region, where the buffer region is located between the trigger region and the converge region;

a range of an exposure ratio multiple corresponding to the trigger region is less than a first exposure ratio multiple or greater than a second exposure ratio multiple;

a range of an exposure ratio multiple corresponding to the buffer region is greater than the first exposure ratio multiple and less than a third exposure ratio multiple or greater than a fourth exposure ratio multiple and less than the second exposure ratio multiple;

a range of an exposure ratio multiple corresponding to the converge region is greater than the third exposure ratio multiple and less than the fourth exposure ratio multiple; and the first exposure ratio multiple, the third exposure ratio multiple, the fourth exposure ratio multiple and the second exposure ratio multiple increase sequentially; and the trigger condition determining module is further configured to determine that the compensation amount meets the preset trigger condition when the compensation amount is located within the trigger region, and trigger the automatic exposure.

To resolve the foregoing technical problems, the embodiments of the present disclosure further provide the following technical solution: an unmanned aerial vehicle (UAV) is provided. The UAV includes:

a body;

an arm, connected to the body;

a power apparatus, arranged in the arm and configured to supply flight power to the UAV;

a flight control module; and a memory, communicatively connected to the flight control module, where the memory stores instructions executable by the flight control module, and the instructions, when executed by the flight control module, cause the flight control module to perform the high-dynamic-range (HDR) image automatic exposure method described above.

Compared with the related art, in the HDR image automatic exposure method provided in the embodiments of the present disclosure, the statistical information and the window weight of the automatic exposure may be first obtained; the evaluation value of the automatic exposure is then obtained according to the statistical information and the window weight that are obtained; the compensation amount of the automatic exposure is further obtained according to the evaluation value and the obtained automatic exposure target value; and the automatic exposure is triggered when the compensation amount meets the preset trigger condition. Therefore, problems such as inaccurate brightness and darkness and oscillation during automatic exposure can be finally avoided.

BRIEF DESCRIPTION OF THE DRAWINGS

One or more embodiments are exemplarily described with reference to the corresponding figures in the accompanying drawings, and the exemplary descriptions are not to be construed as limiting the embodiments. Components in the accompanying drawings that have same reference numerals are represented as similar components, and unless otherwise particularly stated, the figures in the accompanying drawings are not drawn to scale.

DETAILED DESCRIPTION

Figure 1:
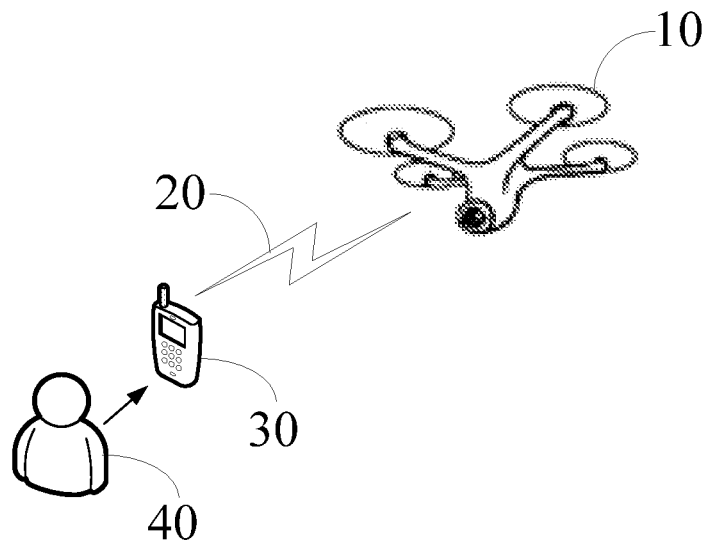
FIG. 1 is a schematic diagram of an application environment according to an embodiment of the present disclosure.

For ease of understanding the present disclosure, the present disclosure is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of this specification, orientation or position relationships indicated by terms such as "up", "down", "inside", "outside" and "bottom" are based on orientation or position relationships shown in the accompanying drawings, and are used only for ease and brevity of illustration and description of the present disclosure, rather than indicating or implying that the mentioned apparatus or component needs to have a particular orientation or needs to be constructed and operated in a particular orientation. Therefore, such terms should not be construed as limiting of the present disclosure. In addition, terms "first", "second" and "third" are only used to describe the objective and cannot be understood as indicating or implying relative importance.

Unless otherwise defined, meanings of all technical and scientific terms used in the present disclosure are the same as that usually understood by a person skilled in the technical field to which the present disclosure belongs. In the present disclosure, terms used in this specification of the present disclosure are merely intended to describe objectives of the specific embodiments, but are not intended to limit the present disclosure. A term "and/or" used in this specification includes any or all combinations of one or more related listed items.

In addition, technical features involved in different embodiments of the present disclosure described below may be combined together if there is no conflict.

The embodiments of the present disclosure provide a high-dynamic-range (HDR) image automatic exposure method and an unmanned aerial vehicle (UAV). According to the HDR image automatic exposure method applicable to a UAV, statistical information and a window weight of automatic exposure are first obtained, an evaluation value of the automatic exposure is then obtained according to the statistical information and the window weight that are obtained, a compensation amount of the automatic exposure is further obtained according to the evaluation value and an obtained automatic exposure target value, and the automatic exposure is triggered when the compensation amount meets a preset trigger condition. Therefore, problems such as inaccurate brightness and darkness and oscillation during automatic exposure can be finally avoided.

An application environment of the HDR image automatic exposure method is described below by using examples.

FIG. 1 is a schematic diagram of an application environment of a UAV control method according to an embodiment of the present disclosure. As shown in FIG. 1, the application environment includes a UAV 10, an infrared wireless network 20, a remote control device 30 and a user 40. The user 40 can use the remote control device 30 to control the UAV 10 through the infrared wireless network.

The UAV 10 may be a UAV driven by any type of power, and includes, but not limited to, a rotary-wing UAV, a fixed-wing UAV, a para-wing UAV, a flapping-wing UAV or a helicopter model.

The UAV 10 may have a corresponding volume or power according to an actual requirement, to provide a load capacity, a flight speed and a flight mileage that can meet a use requirement. One or more functional modules may further be added to the UAV 10 to enable the UAV 10 to implement corresponding functions.

For example, in this embodiment, the UAV 10 includes a battery module, a positioning apparatus, an infrared transmitter, a gimbal and an aerial camera. The aerial camera is mounted on the UAV 10 through the gimbal, to perform operations such as photography and video recording.

The gimbal is configured to fix the aerial camera or freely adjust an attitude of the aerial camera (for example, change a photographing direction of the aerial camera) and stably keep the aerial camera at a set attitude. The gimbal 20 includes a base, a motor and a motor controller. The base is fixedly or detachably connected to the UAV and configured to mount the aerial camera on the UAV. The motor is mounted on the base and connected to the aerial camera. The motor controller is electrically connected to the motor and configured to control the motor. The gimbal may be a multi-axis gimbal, and correspondingly, there are a plurality of motors, namely, a motor is arranged on each axis.

On one hand, the plurality of motors can drive the aerial camera to rotate, to adjust the aerial camera to different photographing directions, and omni-directional scanning and monitoring can be implemented by manually remotely controlling the motor to rotate or causing the motor to rotate automatically through programs. On the other hand, during aerial photography of the UAV, interference to the aerial camera is canceled in real time through rotation of the motor, thereby avoiding jitter of the aerial camera and ensuring the stability of an image captured by the aerial camera.

The aerial camera includes a camera housing and a camera connected to the camera housing. A gimbal connector is arranged on the camera housing and configured to connect to the gimbal. A depth camera is further mounted on the camera housing, and the depth camera and the camera are mounted on a same surface of the camera housing. The depth camera can be mounted on the mounting surface horizontally, longitudinally or obliquely. During rotation of the motor on the gimbal, the depth camera and the camera move synchronously and always face a same direction.

After the battery module accesses to the UAV 10, the battery module can supply power to the UAV 10.

The positioning apparatus may be a global positioning system (GPS), and the GPS is configured to obtain real-time geographical location information of the UAV.

The infrared transmitter is configured to send infrared access information and receive infrared control instructions sent by the remote control device. For example, when the remote control device sends infrared control instructions, the infrared transmitter receives the infrared control instructions and further causes the UAV 10 to control a started state of the UAV 10 according to the infrared control instructions. After the battery module accesses to the UAV 10, the infrared transmitter can send the infrared access information obtained according to access information of the battery module to the remote control device 30.

The UAV 10 includes at least one flight control module. The flight control module, as a control core for flight and data transmission of the UAV 10, can monitor, calculate and control flight and tasks of the UAV. In this embodiment, the flight control module can further modulate binary digital signals into infrared signals in a corresponding optical pulse form or demodulate infrared signals in an optical pulse form into binary digital signals. The remote control device 30 may be any type of smart device configured to establish a communication connection to the UAV 10, for example, a mobile phone, a tablet computer, a notebook computer or another mobile control terminal.

The remote control device 30 includes an infrared receiver. The infrared receiver is configured to receive infrared access information and send infrared control instructions for controlling the UAV. For example, the remote control device 30 may be configured to receive infrared access information from the UAV 10 and generated when the battery module normally accesses the UAV. The remote control device 30 can send infrared control instructions generated according to control instructions of the user 40 to the UAV 10 at the same time, to control the started state of the UAV 10. The remote control device 30 may further include an image transmission module configured to control back transmission of positioning pictures, pictures captured by the gimbal and aiming pictures. In this embodiment, the image transmission module can further modulate binary digital signals into infrared signals in a corresponding optical pulse form or demodulate infrared signals in an optical pulse form into binary digital signals.

The remote control device 30 may further include one or more different user interaction devices, to acquire a user instruction or present or feed back information to the user 40.

The interaction devices include, but not limited to, a button, a display screen, a touch screen, a speaker and a remote control joystick. For example, the remote control device 30 may include a touch display screen. A remote control instruction of the user 40 for the UAV 10 is received by using the touch display screen.

In some embodiments, the existing image visual processing technology may further be fused between the UAV 10 and the remote control device 30 to further provide more intelligent services. For example, the UAV 10 may acquire images through a dual-light camera, and the remote control device 30 analyzes the images, so as to implement gesture control for the UAV 10 by the user 40.

Figure 2:
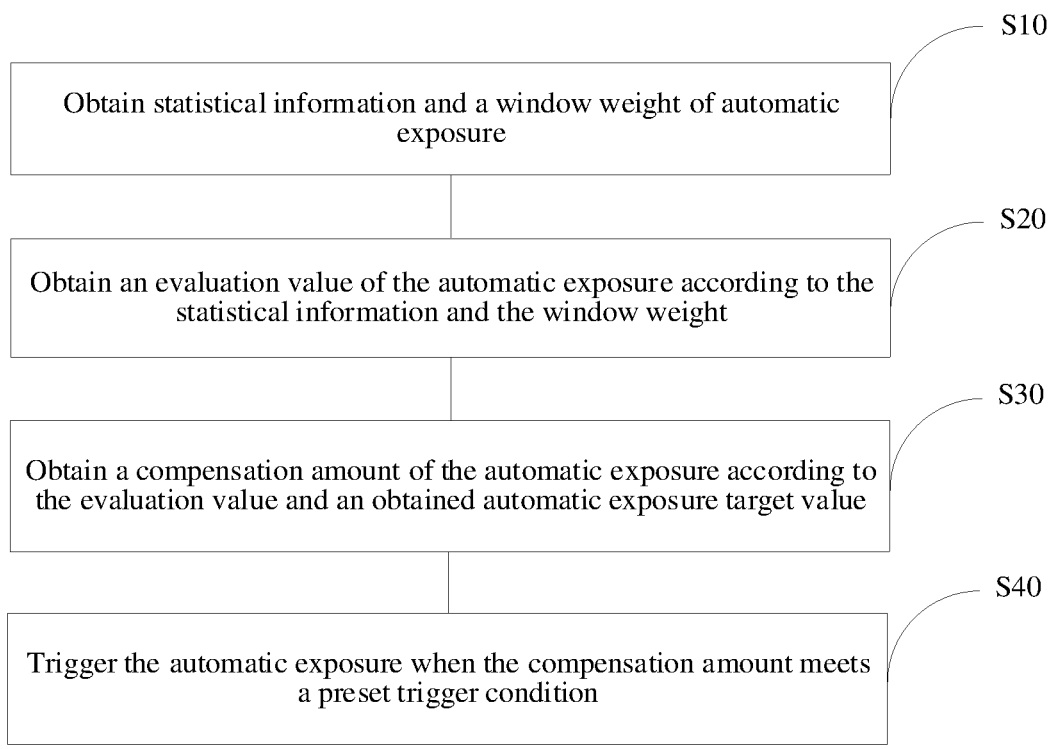
FIG. 2 is a schematic flowchart of a high-dynamic-range (HDR) image automatic exposure method according to an embodiment of the present disclosure.

FIG. 2 shows a schematic flowchart of a high-dynamic-range (HDR) image automatic exposure method according to an embodiment of the present disclosure. The method may be performed by the UAV in FIG. 1. Specifically, referring to FIG. 2, the method may include but is not limited to the following steps:

S10: Obtain statistical information and a window weight of automatic exposure.

Specifically, an image sensor chip is built in the UAV. The image sensor chip can obtain the statistical information and the window weight of the automatic exposure.

The statistical information may include long exposure statistical information, medium exposure statistical information and short exposure statistical information. The long exposure statistical information, the medium exposure statistical information and the short exposure statistical information are three 4×32 tables. For example, Table 1 represents the long exposure statistical information, Table 2 represents the medium exposure statistical information, and Table 3 represents the short exposure statistical information.

TABLE 1

|    | 0    | 1    | 2    | 3 Long |
|----|------|------|------|--------|
| 0  | D0   | D1   | D2   | D3     |
| 1  | D4   | D5   | D6   | D7     |
| 2  | D8   | D9   | D10  | D11    |
| .  |      |      |      |        |
| 30 | D376 | D377 | D378 | D379   |
| 31 | D124 | D125 | D126 | D127   |

TABLE 2

|    |      |      |      | Middle |
|----|------|------|------|--------|
| 0  | D128 | D129 | D130 | D131   |
| 1  | D132 | D133 | D134 | D135   |
| 2  | D136 | D137 | D138 | D139   |
| .  |      |      |      |        |
| 30 | D248 | D249 | D250 | D251   |
| 31 | D252 | D253 | D254 | D255   |

TABLE 3

|    |      |      |      | Short |
|----|------|------|------|-------|
| 0  | D256 | D257 | D258 | D259  |
| 1  | D260 | D261 | D262 | D263  |
| 2  | D264 | D265 | D266 | D267  |
| .  |      |      |      |       |
| 30 | D376 | D377 | D378 | D379  |
| 31 | D380 | D381 | D382 | D383  |

As shown in Table 4, a window weight table includes a plurality of window weights. The window weight table is also a 4×32 window weight table, which slightly focuses on a center of an image and helps human eyes to focus on the center. The long exposure statistical information, the medium exposure statistical information and the short exposure statistical information all correspond to a same window weight table, and the window weight table includes a plurality of window weights. That is, window weights of three times of exposure are all from the same window weight table.

TABLE 4

|   | 1 | 2 | 3 | 4 |
|---|---|---|---|---|
| 1 | 1 | 1 | 1 | 1 |
| 2 | 1 | 1 | 1 | 1 |
| 3 | 1 | 1 | 1 | 1 |
| 4 | 1 | 1 | 1 | 1 |
| 5 | 1 | 1 | 1 | 1 |

TABLE 4-continued

|    | 1 | 2 | 3 | 4 |
|----|---|---|---|---|
| 6  | 1 | 1 | 1 | 1 |
| 7  | 1 | 1 | 1 | 1 |
| 8  | 1 | 1 | 1 | 1 |
| 9  | 1 | 4 | 4 | 1 |
| 10 | 1 | 4 | 4 | 1 |
| 11 | 1 | 4 | 4 | 1 |
| 12 | 1 | 4 | 4 | 1 |
| 13 | 1 | 4 | 4 | 1 |
| 14 | 2 | 5 | 5 | 2 |
| 15 | 2 | 5 | 5 | 2 |
| 16 | 2 | 5 | 5 | 2 |
| 17 | 2 | 5 | 5 | 2 |
| 18 | 1 | 4 | 4 | 1 |
| 19 | 1 | 4 | 4 | 1 |
| 20 | 1 | 4 | 4 | 1 |
| 21 | 1 | 4 | 4 | 1 |
| 22 | 1 | 4 | 4 | 1 |
| 23 | 1 | 1 | 1 | 1 |
| 24 | 1 | 1 | 1 | 1 |
| 25 | 1 | 1 | 1 | 1 |
| 26 | 1 | 1 | 1 | 1 |
| 27 | 1 | 1 | 1 | 1 |
| 28 | 1 | 1 | 1 | 1 |
| 29 | 1 | 1 | 1 | 1 |
| 30 | 1 | 1 | 1 | 1 |
| 31 | 1 | 1 | 1 | 1 |
| 32 | 1 | 1 | 1 | 1 |

S20: Obtain an evaluation value of the automatic exposure according to the statistical information and the window weight.

Specifically, window statistical values corresponding to the long exposure statistical information, the medium exposure statistical information and the short exposure statistical information are first obtained, and the evaluation value of the automatic exposure can be obtained according to the window statistical values and corresponding window weights. The evaluation value includes a long exposure evaluation value, a medium exposure evaluation value and a short exposure evaluation value.

For example, a first weight ratio of a window weight corresponding to a long exposure window statistical value in the long exposure statistical information to a total window weight is first obtained, and the long exposure window statistical value is then multiplied by the first weight ratio to obtain the long exposure evaluation value. In another example, a second weight ratio of a window weight corresponding to a medium exposure window statistical value in the medium exposure statistical information to the total window weight is first obtained, and the medium exposure window statistical value is then multiplied by the second weight ratio to obtain the medium exposure evaluation value. In another example, a third weight ratio of a window weight corresponding to a short exposure window statistical value in the short exposure statistical information to the total window weight is first obtained, and the short exposure window statistical value is then multiplied by the third weight ratio to obtain the short exposure evaluation value.

S30: Obtain a compensation amount of the automatic exposure according to the evaluation value and an obtained automatic exposure target value.

The automatic exposure target value includes a long exposure target value, a medium exposure target value and a short exposure target value, and the long exposure target value, the medium exposure target value and the short exposure target value respectively correspond to a long exposure weight value, a medium exposure weight value and a short exposure weight value. The long exposure target value, the medium exposure target value and the short exposure target value, and the long exposure weight value, the medium exposure weight value and the short exposure weight value that are distributed corresponding to the long exposure target value, the medium exposure target value and the short exposure target value are all set by a user and need to be set by a user image quality engineer during image quality adjustment.

Specifically, a first compensation amount is first obtained according to the long exposure target value, the long exposure weight value and the long exposure evaluation value; a second compensation amount is obtained according to the medium exposure target value, the medium exposure weight value and the medium exposure evaluation value; a third compensation amount is obtained according to the short exposure target value, the short exposure weight value and the short exposure evaluation value; and the compensation amount is then obtained according to the first compensation amount, the second compensation amount and the third compensation amount.

S40: Trigger the automatic exposure when the compensation amount meets a preset trigger condition.

Specifically, the method further includes: dividing an automatic exposure region into a trigger region, a buffer region and a converge region, where the buffer region is located between the trigger region and the converge region; a range of an exposure ratio multiple corresponding to the trigger region is less than a first exposure ratio multiple or greater than a second exposure ratio multiple; a range of an exposure ratio multiple corresponding to the buffer region is greater than the first exposure ratio multiple and less than a third exposure ratio multiple or greater than a fourth exposure ratio multiple and less than the second exposure ratio multiple; a range of an exposure ratio multiple corresponding to the converge region is greater than the third exposure ratio multiple and less than the fourth exposure ratio multiple; and the first exposure ratio multiple, the third exposure ratio multiple, the fourth exposure ratio multiple and the second exposure ratio multiple increase sequentially.

Further, the method further includes: determining that the compensation amount meets the preset trigger condition when the compensation amount is located within the trigger region, and triggering the automatic exposure; and determining that the compensation amount does not meet the preset trigger condition when the compensation amount is located within the buffer region, and skipping triggering the automatic exposure.

The embodiments of the present disclosure provide an HDR image automatic exposure method. In the method, the statistical information and the window weight of the automatic exposure are first obtained; the evaluation value of the automatic exposure is then obtained according to the statistical information and the window weight that are obtained; the compensation amount of the automatic exposure is further obtained according to the evaluation value and the obtained automatic exposure target value; and the automatic exposure is triggered when the compensation amount meets the preset trigger condition. Therefore, problems such as inaccurate brightness and darkness and oscillation during automatic exposure can be finally avoided.

Figure 3:
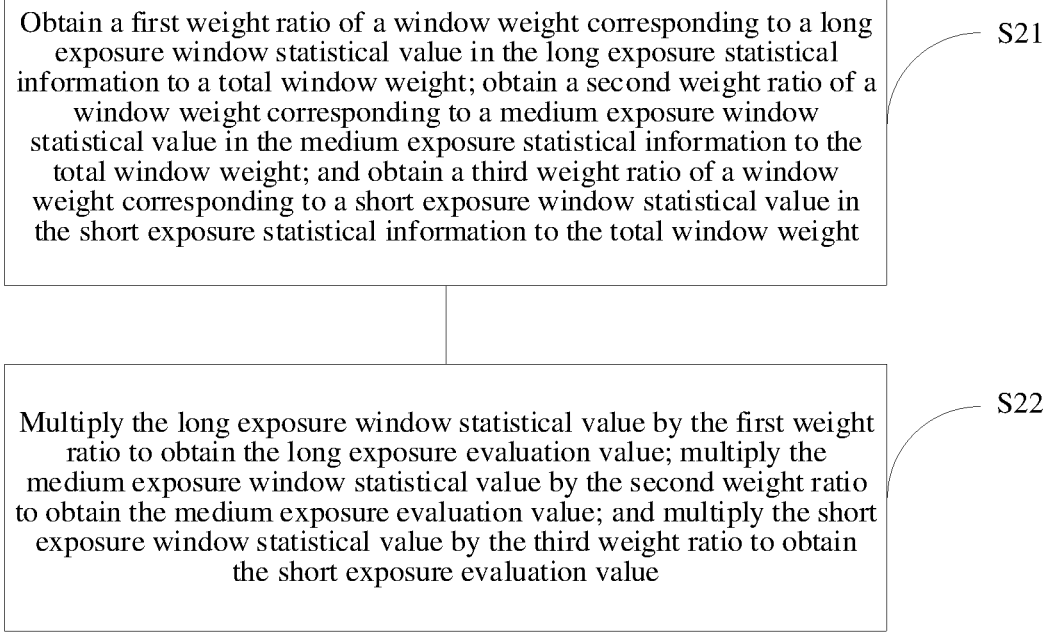
FIG. 3 is a schematic flowchart of S20 in FIG. 2.

To better obtain the evaluation value of the automatic exposure according to the statistical information and the window weight, in some embodiments, referring to FIG. 3, S20 includes the following steps:

S21: Obtain a first weight ratio of a window weight corresponding to a long exposure window statistical value in the long exposure statistical information to a total window weight; obtain a second weight ratio of a window weight corresponding to a medium exposure window statistical value in the medium exposure statistical information to the total window weight; and obtain a third weight ratio of a window weight corresponding to a short exposure window statistical value in the short exposure statistical information to the total window weight.

Specifically, the first weight ratio, the second weight ratio and the third weight ratio can be respectively obtained according to the following formula:

$$B = \frac{W_{(i,j)}}{\sum_{i=1,j=1}^{i=4,j=32} W_{(i,j)}}$$

W(i,j) is the window weight in the window weight table, and B is the first weight ratio, the second weight ratio or the third weight ratio.

S22: Multiply the long exposure window statistical value by the first weight ratio to obtain the long exposure evaluation value; multiply the medium exposure window statistical value by the second weight ratio to obtain the medium exposure evaluation value; and multiply the short exposure window statistical value by the third weight ratio to obtain the short exposure evaluation value.

Specifically, the long exposure evaluation value, the medium exposure evaluation value and the short exposure evaluation value can be respectively obtained according to the following formula.

$$P = B * \sum_{i=1,j=1}^{i=4,j=32} E_{(i,j)}$$

B is the first weight ratio, the second weight ratio or the third weight ratio; and E(i,j) is the long exposure window statistical value in the long exposure statistical information, the medium exposure window statistical value in the medium exposure statistical information or the short exposure window statistical value in the short exposure statistical information.

Figure 4:
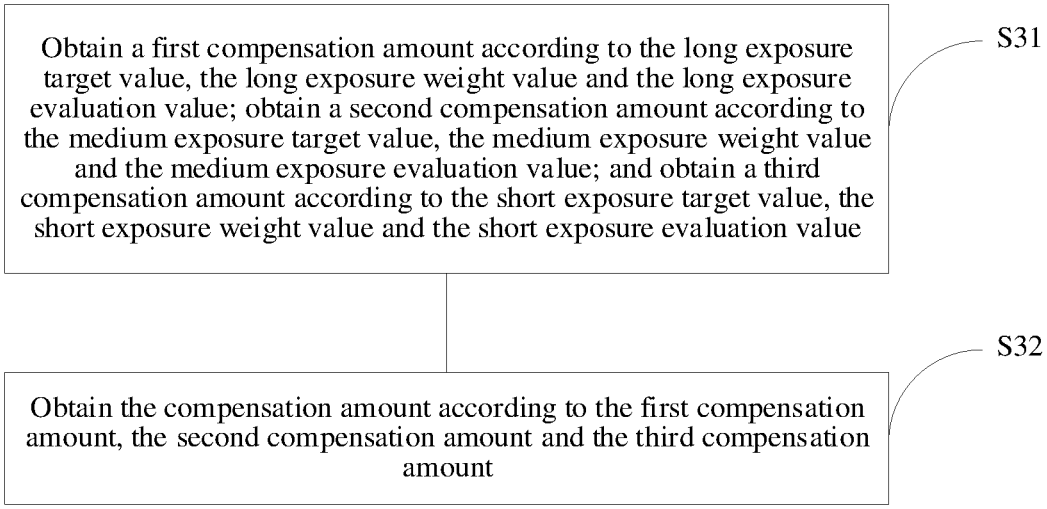
FIG. 4 is a schematic flowchart of S30 in FIG. 2.

To better obtain the compensation amount of the automatic exposure according to the evaluation value and the obtained automatic exposure target value, in some embodiments, referring to FIG. 4, S30 includes the following steps:

S31: Obtain a first compensation amount according to the long exposure target value, the long exposure weight value and the long exposure evaluation value; obtain a second compensation amount according to the medium exposure target value, the medium exposure weight value and the medium exposure evaluation value; and obtain a third compensation amount according to the short exposure target value, the short exposure weight value and the short exposure evaluation value.

The automatic exposure target value includes a long exposure target value, a medium exposure target value and a short exposure target value, and the long exposure target value, the medium exposure target value and the short exposure target value respectively correspond to a long exposure weight value, a medium exposure weight value and a short exposure weight value.

Specifically, the first compensation amount, the second compensation amount and the third compensation amount can be respectively obtained according to the following formula.

$$C1 = \frac{\frac{D_l}{P_l} \times A_l}{A_l + A_m + A_s}$$

C1 is the first compensation amount, $D_l$ is the long exposure target value, $A_l$ is the long exposure weight value, $A_m$ is the medium exposure weight value and $A_s$ is the short exposure weight value.

$$C2 = \frac{\frac{D_m}{P_m} \times A_m}{A_l + A_m + A_s}$$

C2 is the second compensation amount, $D_m$ is the medium exposure target value, $A_l$ is the long exposure weight value, $A_m$ is the medium exposure weight value and $A_s$ is the short exposure weight value.

$$C3 = \frac{\frac{D_s}{P_s} \times A_s}{A_l + A_m + A_s}$$

C3 is the third compensation amount, $D_s$ is the short exposure target value, $A_l$ is the long exposure weight value, $A_m$ is the medium exposure weight value and $A_s$ is the short exposure weight value.

S32: Obtain the compensation amount according to the first compensation amount, the second compensation amount and the third compensation amount.

Specifically, summation processing is performed on the first compensation amount C1, the second compensation amount C2 and the third compensation amount C3, to obtain a compensation amount C=C1+C2+C3.

Figure 5:
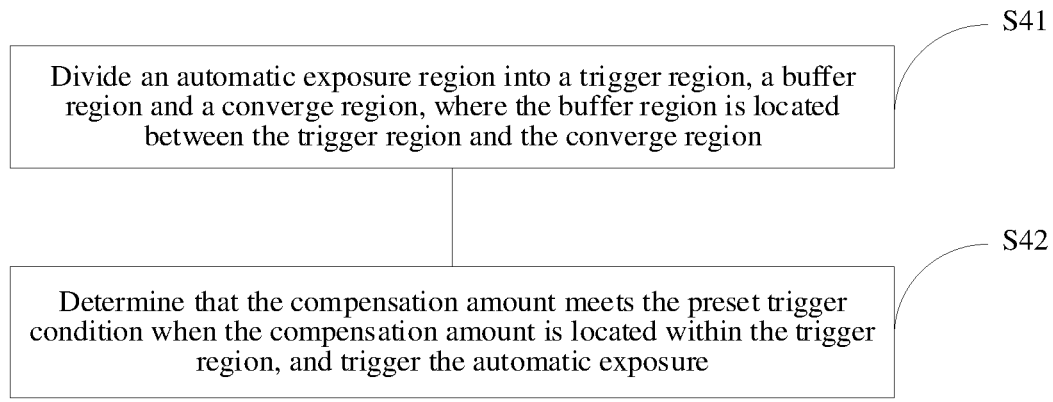
FIG. 5 is a schematic flowchart of S40 in FIG. 2.

To better trigger the automatic exposure when the compensation amount meets the preset trigger condition, in some embodiments, referring to FIG. 5, S40 further includes the following steps:

S41: Divide an automatic exposure region into a trigger region, a buffer region and a converge region, where the buffer region is located between the trigger region and the converge region.

A range of an exposure ratio multiple corresponding to the trigger region is less than a first exposure ratio multiple or greater than a second exposure ratio multiple;

a range of an exposure ratio multiple corresponding to the buffer region is greater than the first exposure ratio multiple and less than a third exposure ratio multiple or greater than a fourth exposure ratio multiple and less than the second exposure ratio multiple; a range of an exposure ratio multiple corresponding to the converge region is greater than the third exposure ratio multiple and less than the fourth exposure ratio multiple; and the first exposure ratio multiple, the third exposure ratio multiple, the fourth exposure ratio multiple and the second exposure ratio multiple increase sequentially.

S42: Determine that the compensation amount meets the preset trigger condition when the compensation amount is located within the trigger region, and trigger the automatic exposure.

Figure 6:
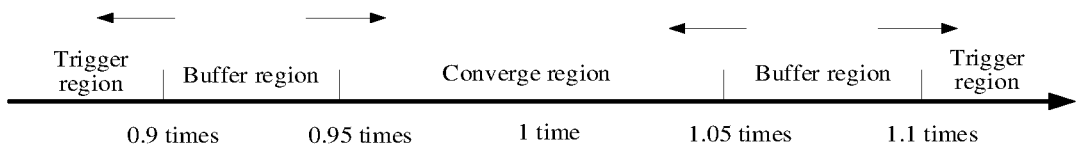
FIG. 6 is a schematic structural diagram of a trigger region, a buffer region and a converge region according to an embodiment of the present disclosure.

For example, as shown in FIG. 6, in a case that the first exposure ratio multiple, the third exposure ratio multiple, the fourth exposure ratio multiple and the fourth exposure ratio multiple are respectively 0.9 times, 0.95 times, 1.05 times and 1.1 times, it is defined that the compensation amount in the trigger region is less than 0.9 times or greater than 1.1 times; it is defined that the compensation amount in the buffer region ranges from 0.9 times to 0.95 times or from 1.05 times to 1.1 times, namely, when the compensation amount is greater than 0.9 times and less than 1.1 times, the automatic exposure is skipped; and it is defined that the compensation amount in the converge region ranges from 0.95 times to 1.05 times, namely, when the compensation amount is greater than 0.95 times and less than 1.05 times, it is determined that convergence is completed. A main function of addition of the buffer region is to prevent oscillation.

In an actual application scenario, it is assumed that an image becomes bright suddenly, a statistical value increases, an evaluation value therefore increases, a compensation amount obtained through calculation decreases and is less than 0.9 times, and the automatic exposure is triggered. During convergence, the statistical value decreases gradually, the compensation amount obtained through calculation increases gradually, the automatic exposure is skipped until the compensation amount is greater than 0.95 times, and convergence is completed.

Similarly, it is assumed that the image becomes dark suddenly, the compensation amount obtained through calculation increases and is greater than 1.1 times, and the automatic exposure is triggered. During convergence, the statistical value increases gradually, the compensation amount obtained through calculation decreases gradually, the automatic exposure is skipped until the compensation amount is less than 1.05 times, and convergence is completed. If the brightness does not change greatly, namely, the compensation amount is not less than 0.9 times or greater than 1.1 times, the automatic exposure is skipped. In this way, repeated triggering and oscillation are prevented.

It should be noted that, in the foregoing embodiments, the steps are not necessarily performed according to a specific order. According to the descriptions of the embodiments of the present disclosure, a person of ordinary skill in the art may understand that in different embodiments, the steps may be performed according to different orders, namely, the steps may be performed simultaneously or may be performed alternately.

Figure 7:
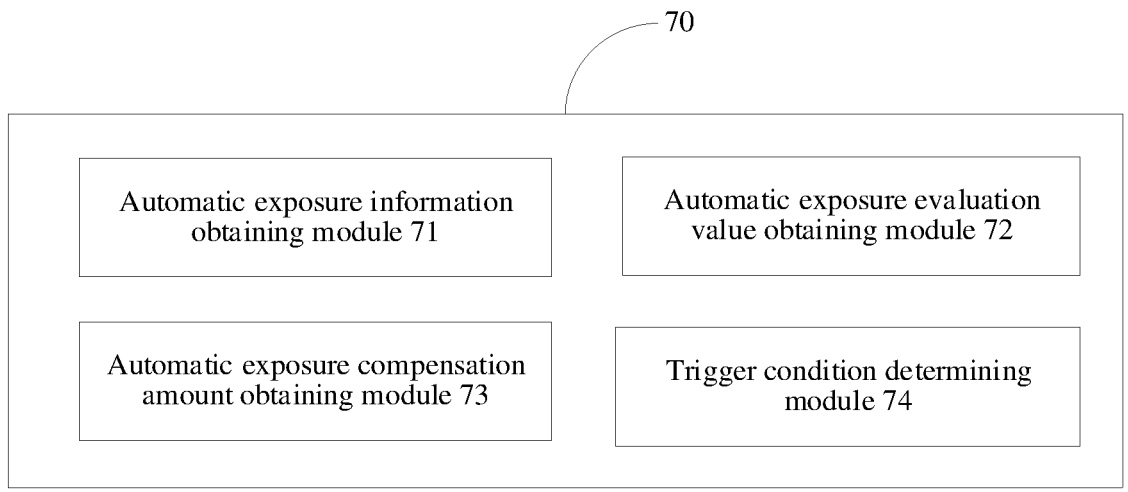
FIG. 7 is a structural block diagram of an HDR image automatic exposure method apparatus according to an embodiment of the present disclosure.

According to another aspect of the embodiments of the present disclosure, the embodiments of the present disclosure provide a high-dynamic-range (HDR) image automatic exposure method apparatus 70, and the HDR image automatic exposure method apparatus is applicable to an unmanned aerial vehicle (UAV). Referring to FIG. 7, the HDR image automatic exposure method apparatus 70 includes: an automatic exposure information obtaining module 71, an automatic exposure evaluation value obtaining module 72, an automatic exposure compensation amount obtaining module 73 and a trigger condition determining module 74.

The automatic exposure information obtaining module 71 is configured to obtain statistical information and a window weight of automatic exposure.

The automatic exposure evaluation value obtaining module 72 is configured to obtain an evaluation value of the automatic exposure according to the statistical information and the window weight.

The automatic exposure compensation amount obtaining module 73 is configured to obtain a compensation amount of the automatic exposure according to the evaluation value and an obtained automatic exposure target value.

The trigger condition determining module 74 is configured to trigger the automatic exposure when the compensation amount meets a preset trigger condition.

Therefore, in this embodiment, the statistical information and the window weight of the automatic exposure are first obtained; the evaluation value of the automatic exposure is then obtained according to the statistical information and the window weight that are obtained; the compensation amount of the automatic exposure is further obtained according to the evaluation value and the obtained automatic exposure target value; and the automatic exposure is triggered when the compensation amount meets the preset trigger condition. Therefore, problems such as inaccurate brightness and darkness and oscillation during automatic exposure can be finally avoided.

In some embodiments, the automatic exposure evaluation value obtaining module includes a weight ratio calculation unit and an evaluation value calculation unit, where the weight ratio calculation unit is configured to obtain a first weight ratio of a window weight corresponding to long exposure statistical information to a total window weight; obtain a second weight ratio of a window weight corresponding to medium exposure statistical information to the total window weight; and obtain a third weight ratio of a window weight corresponding to short exposure statistical information to the total window weight; and the evaluation value calculation unit is configured to multiply the long exposure statistical information by the first weight ratio to obtain the long exposure evaluation value; multiply the medium exposure statistical information by the second weight ratio to obtain the medium exposure evaluation value; and multiply the short exposure statistical information by the third weight ratio to obtain the short exposure evaluation value.

In some embodiments, the trigger condition determining module is further configured to determine that the compensation amount meets the preset trigger condition when the compensation amount is located within the trigger region, and trigger the automatic exposure. The method further includes: dividing an automatic exposure region into a trigger region, a buffer region and a converge region, where the buffer region is located between the trigger region and the converge region; a range of an exposure ratio multiple corresponding to the trigger region is less than a first exposure ratio multiple or greater than a second exposure ratio multiple; a range of an exposure ratio multiple corresponding to the buffer region is greater than the first exposure ratio multiple and less than a third exposure ratio multiple or greater than a fourth exposure ratio multiple and less than the second exposure ratio multiple; a range of an exposure ratio multiple corresponding to the converge region is greater than the third exposure ratio multiple and less than the fourth exposure ratio multiple; and the first exposure ratio multiple, the third exposure ratio multiple, the fourth exposure ratio multiple and the second exposure ratio multiple increase sequentially.

Figure 8:
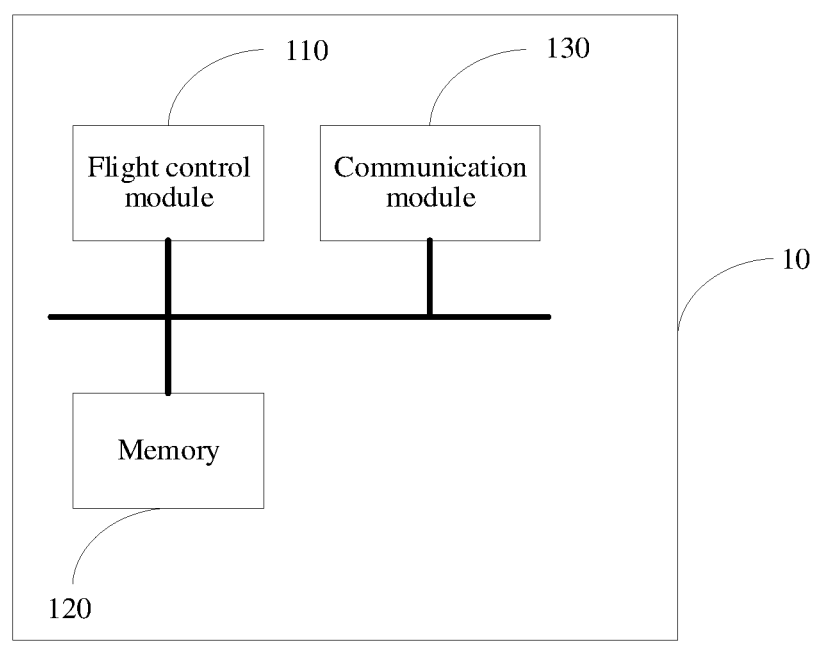
FIG. 8 is a structural block diagram of an unmanned aerial vehicle (UAV) according to an embodiment of the present disclosure.

FIG. 8 is a schematic structural diagram of a UAV 10 according to an embodiment of the present disclosure. The UAV 10 may be any type of unmanned vehicle capable of performing the HDR image automatic exposure method provided in the foregoing corresponding method embodiments or executing the HDR image automatic exposure method apparatus 70 provided in the foregoing corresponding apparatus embodiments. The UAV includes: a body, an arm, a power apparatus, an infrared transmitter, a flight control module 110, a memory 120 and a communication module 130.

The arm is connected to the body; the power apparatus is arranged in the arm and configured to supply flight power to the UAV; the infrared transmitter is arranged in the body and configured to send infrared access information and receive infrared control instructions sent by a remote control device; and the flight control module can monitor, calculate and control flight and tasks of the UAV and includes a set of devices for transmission and recycle control of the UAV. The flight control module can further modulate binary digital signals into infrared signals in a corresponding optical pulse form or demodulate infrared signals in an optical pulse form into binary digital signals.

Any two of the flight control module 110, the memory 120 and the communication module 130 are communicatively connected by a bus.

The flight control module 110 may be any type of flight control module 110 that has one or more processing cores, which can perform single-threaded or multi-threaded operations and is configured to analyze instructions to perform operations such as obtaining data, performing logical operation functions and delivering operation processing results.

The memory 120, as a non-transitory computer-readable storage medium, may be configured to store non-transitory software programs, non-transitory computer-executable programs and modules, such as program instructions/modules (for example, the automatic exposure information obtaining module 71, the automatic exposure evaluation value obtaining module 72, the automatic exposure compensation amount obtaining module 73 and the trigger condition determining module 74 shown in FIG. 7) corresponding to the HDR image automatic exposure method in the embodiment of the present disclosure. The flight control module 110 performs various functional applications and data processing of the HDR image automatic exposure method apparatus 70 by running the non-transitory software programs, instructions and modules stored in the memory 120, that is, implementing the HDR image automatic exposure method according to any of the foregoing method embodiments.

The memory 120 may include a program storage area and a data storage area. The program storage area may store an operating system and an application program that is required for at least one function. The data storage area may store data created according to use of the HDR image automatic exposure method apparatus 70. In addition, the memory 120 may include a high-speed random access memory, and may further include a non-transitory memory, such as at least one magnetic disk memory device, a flash memory device, or other non-transitory solid-state memory devices. In some embodiments, the memory 120 optionally includes memories remotely arranged relative to the flight control module 110, and these remote memories may be connected to the UAV 10 through a network. Examples of the network include, but are not limited to, the Internet, an intranet, a local area network, a mobile communication network and a combination thereof.

The memory 120 stores instructions executable by the at least one flight control module 110; and the at least one flight control module 110 is configured to execute the instructions, to implement the HDR image automatic exposure method in any of the foregoing method embodiments, for example, perform the foregoing described method steps 10, 20, 30 and 40 or implement functions of the modules 71 to 74 in FIG. 7.

The communication module 130 is a functional module configured to establish a communication connection and provide a physical channel. The communication module 130 may be any type of wireless or wired communication module 130, which includes, but not limited to, a Wi-Fi module or a Bluetooth module.

Further, the embodiments of the present disclosure further provide a non-transitory computer-readable storage medium, the non-transitory computer-readable storage medium stores computer-executable instructions, and the computer-executable instructions are executed by one or more flight control modules 110, for example, one flight control module 110 shown in FIG. 7, so that the one or more flight control modules 110 perform the HDR image automatic exposure method in any of the foregoing method embodiments, for example, perform the foregoing described method steps 10, 20, 30 and 40 or implement functions of the modules 71 to 74 in FIG. 7.

The foregoing described apparatus embodiments are merely examples. The units described as separate parts may or may not be physically separate, and the parts displayed as units may or may not be physical units, may be located in one position, or may be distributed on a plurality of network units. Some or all of the modules may be selected according to actual requirements to achieve the objectives of the solutions of the embodiments.

Based on the descriptions of the foregoing implementations, a person of ordinary skill in the art may clearly understand that the implementations may be implemented by software in addition to a universal hardware platform, or by hardware. A person of ordinary skill in the art may understand that all or some of procedures in the foregoing methods embodiment may be implemented by a computer program in a computer program product instructing relevant hardware. The computer program may be stored in a non-transitory computer-readable storage medium, and the computer program includes program instructions. When the program instructions are executed by a related device, the related device may be enabled to execute the procedures of the foregoing method embodiments. The storage medium may be a magnetic disk, an optical disc, a read-only memory (ROM), or a random access memory (RAM).

For the foregoing product, the HDR image automatic exposure method provided in the embodiments of the present disclosure may be performed, and the corresponding functional modules for performing the HDR image automatic exposure method and beneficial effects thereof are provided. For technical details not described in detail in this embodiment, reference may be made to the HDR image automatic exposure method provided in the embodiments of the present disclosure.

The present disclosure is described with reference to flowcharts and/or block diagrams of the method, device (system) and computer program product in the embodiments of the present disclosure. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The foregoing descriptions are merely exemplary embodiments of the present disclosure, but are not intended to limit the present disclosure. Any modification, equivalent replacement, or improvement made without departing from the spirit and principle of the present disclosure shall fall within the protection scope of the present disclosure.

Finally, it should be noted that the foregoing embodiments are merely used for describing the technical solutions of the present disclosure, but are not intended to limit the present disclosure. Under the ideas of the present disclosure, the technical features in the foregoing embodiments or different embodiments may also be combined, the steps may be performed in any order, and many other changes of different aspects of the present disclosure also exist as described above, and these changes are not provided in detail for simplicity. It should be understood by a person of ordinary skill in the art that although the present disclosure has been described in detail with reference to the foregoing embodiments, modifications can still be made to the technical solutions described in the foregoing embodiments, or equivalent replacements can be made to some technical features in the technical solutions; and these modifications or replacements will not cause the essence of corresponding technical solutions to depart from the scope of the technical solutions in the embodiments of the present disclosure.

What is claimed is:

1. A high-dynamic-range (HDR) image automatic exposure method, applied to an unmanned aerial vehicle (UAV), the method comprising:
    obtaining statistical information and a window weight of automatic exposure;
    obtaining an evaluation value of the automatic exposure according to the statistical information and the window weight;
    obtaining a compensation amount of the automatic exposure according to the evaluation value and an obtained automatic exposure target value; and
    triggering the automatic exposure when the compensation amount meets a preset trigger condition;
    the automatic exposure target value comprises a long exposure target value, a medium exposure target value and a short exposure target value, and the long exposure target value, the medium exposure target value and the short exposure target value respectively correspond to a long exposure weight value, a medium exposure weight value and a short exposure weight value; and
    the obtaining a compensation amount of the automatic exposure according to the evaluation value and an obtained automatic exposure target value comprises:
    obtaining a first compensation amount according to the long exposure target value, the long exposure weight value and the long exposure evaluation value;
    obtaining a second compensation amount according to the medium exposure target value, the medium exposure weight value and the medium exposure evaluation value;
    obtaining a third compensation amount according to the short exposure target value, the short exposure weight value and the short exposure evaluation value; and
    obtaining the compensation amount according to the first compensation amount, the second compensation amount and the third compensation amount,
    dividing an automatic exposure region into a trigger region, a buffer region and a converge region, wherein the buffer region is located between the trigger region and the converge region;
    a range of an exposure ratio multiple corresponding to the trigger region is less than a first exposure ratio multiple or greater than a second exposure ratio multiple;
    a range of an exposure ratio multiple corresponding to the buffer region is greater than the first exposure ratio multiple and less than a third exposure ratio multiple or greater than a fourth exposure ratio multiple and less than the second exposure ratio multiple;
    a range of an exposure ratio multiple corresponding to the converge region is greater than the third exposure ratio multiple and less than the fourth exposure ratio multiple; and
    the first exposure ratio multiple, the third exposure ratio multiple, the fourth exposure ratio multiple and the second exposure ratio multiple increase sequentially; and
    the triggering the automatic exposure when the compensation amount meets a preset trigger condition comprises:
    determining that the compensation amount meets the preset trigger condition when the compensation amount is located within the trigger region, and triggering the automatic exposure.

2. The method according to claim 1, wherein
    obtaining, according to an exposure ratio multiple, weight ratios of window weights corresponding to statistical values in statistical information of a plurality of times of exposure to a total window weight respectively; and
    multiplying the statistical values by the corresponding weight ratios, to obtain the evaluation value of the automatic exposure.

3. The method according to claim 2, wherein the statistical information comprises long exposure statistical information, medium exposure statistical information and short exposure statistical information; and
    the long exposure statistical information, the medium exposure statistical information and the short exposure statistical information correspond to a same window weight table, and the window weight table comprises the window weights.

4. The method according to claim 3, wherein
    the evaluation value comprises a long exposure evaluation value, a medium exposure evaluation value and a short exposure evaluation value;
    the obtaining an evaluation value of the automatic exposure according to the statistical information and the window weight comprises:
    obtaining a first weight ratio of a window weight corresponding to a long exposure window statistical value in the long exposure statistical information to the total window weight;
    obtaining a second weight ratio of a window weight corresponding to a medium exposure window statistical value in the medium exposure statistical information to the total window weight; and
    obtaining a third weight ratio of a window weight corresponding to a short exposure window statistical value in the short exposure statistical information to the total window weight; and the multiplying the statistical values by the corresponding weight ratios, to obtain the evaluation value of the automatic exposure further comprises:

multiplying the long exposure window statistical value by the first weight ratio to obtain the long exposure evaluation value;

multiplying the medium exposure window statistical value by the second weight ratio to obtain the medium exposure evaluation value; and multiplying the short exposure window statistical value by the third weight ratio to obtain the short exposure evaluation value.

5. The method according to claim 1, further comprising:
determining that the compensation amount does not meet the preset trigger condition when the compensation amount is located within the buffer region, and skipping triggering the automatic exposure.

6. An unmanned aerial vehicle (UAV), comprising:
a body;
an arm, connected to the body;
a power apparatus, arranged in the arm and configured to supply flight power to the UAV;
a flight control module is configured to a control core for flight and data transmission of the UAV;
a memory, communicatively connected to the flight control module, wherein the memory stores instructions executable by the flight control module, and the instructions, when executed by the flight control module, cause the flight control module to:
obtain statistical information and a window weight of automatic exposure;
obtain an evaluation value of the automatic exposure according to the statistical information and the window weight;
obtain a compensation amount of the automatic exposure according to the evaluation value and an obtained automatic exposure target value; and
trigger the automatic exposure when the compensation amount meets a preset trigger condition;
the automatic exposure target value comprises a long exposure target value, a medium exposure target value and a short exposure target value, and the long exposure target value, the medium exposure target value and the short exposure target value respectively correspond to a long exposure weight value, a medium exposure weight value and a short exposure weight value; and
the obtain a compensation amount of the automatic exposure according to the evaluation value and an obtained automatic exposure target value further comprises:
obtain a first compensation amount according to the long exposure target value, the long exposure weight value and the long exposure evaluation value;
obtain a second compensation amount according to the medium exposure target value, the medium exposure weight value and the medium exposure evaluation value;
obtain a third compensation amount according to the short exposure target value, the short exposure weight value and the short exposure evaluation value; and
obtain the compensation amount according to the first compensation amount, the second compensation amount and the third compensation amount;
divide an automatic exposure region into a trigger region, a buffer region and a converge region, wherein the buffer region is located between the trigger region and the converge region;
a range of an exposure ratio multiple corresponding to the trigger region is less than a first exposure ratio multiple or greater than a second exposure ratio multiple;
a range of an exposure ratio multiple corresponding to the buffer region is greater than the first exposure ratio multiple and less than a third exposure ratio multiple or greater than a fourth exposure ratio multiple and less than the second exposure ratio multiple;
a range of an exposure ratio multiple corresponding to the converge region is greater than the third exposure ratio multiple and less than the fourth exposure ratio multiple;
the first exposure ratio multiple, the third exposure ratio multiple, the fourth exposure ratio multiple and the second exposure ratio multiple increase sequentially; and
determine that the compensation amount meets the preset trigger condition when the compensation amount is located within the trigger region, and triggering the automatic exposure.

7. The UAV according to claim 6, wherein the flight control module is further configured to:
obtain, according to an exposure ratio multiple, weight ratios of window weights corresponding to statistical values in statistical information of a plurality of times of exposure to a total window weight respectively; and
multiply the statistical values by the corresponding weight ratios, to obtain the evaluation value of the automatic exposure.

8. The UAV according to claim 7, wherein the flight control module is further configured to:
wherein the statistical information comprises long exposure statistical information, medium exposure statistical information and short exposure statistical information; and
the long exposure statistical information, the medium exposure statistical information and the short exposure statistical information correspond to a same window weight table, and the window weight table comprises the window weights.

* * * * *